UNITED STATES PATENT OFFICE.

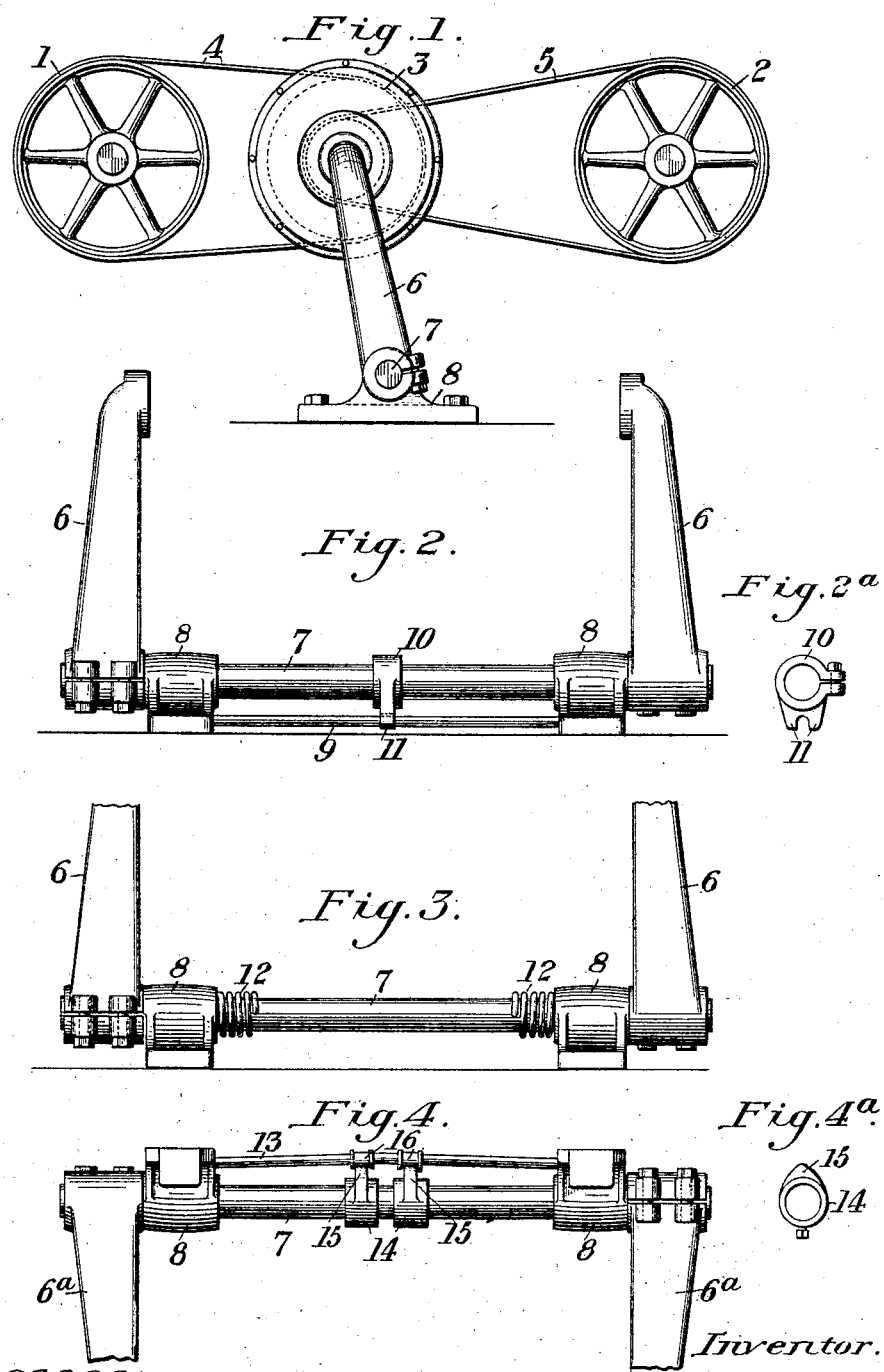

CHARLES J. REED, OF PHILADELPHIA, PENNSYLVANIA.

SPEED-CHANGING MECHANISM.

No. 858,024.  Specification of Letters Patent.  Patented June 25, 1907.

Application filed February 23, 1905. Serial No. 246,964.

*To all whom it may concern:*

Be it known that I, CHARLES J. REED, a citizen of the United States, residing at Philadelphia, in the county of Philadelphia and State of Pennsylvania, have invented certain new and useful Improvements in Speed-Changing Mechanism, of which the following is a specification.

In U. S. Patent 758,561, granted to me April 26, 1904, I have shown a speed-changing mechanism comprising an expansible double pulley placed between and belted to pulleys on the driving and driven shafts. The expansible pulley is carried by a shaft journaled in the ends of arms which are fixed on a rockshaft. When the rim-sections of the expansible pulley are shifted to vary the speed of the driven shaft, this pulley rocks to compensate for the corresponding changes in the working lengths of the belts by which it receives and transmits power. As the pulley rocks, its center of gravity shifts to one side or the other of its line of support and the horizontal component of its unbalanced weight is added to the normal tension of one belt and subtracted from that of the other. The friction of the belts on the pulleys is thereby rendered unequal and the belts are unduly stretched.

The present invention is a means for counterbalancing the weight of an expansible pulley as it rocks during adjustment. The preferred means is a spring which engages the rock-shaft carrying the pulley-supporting arms and acts in opposition to the force of gravity on the pulley.

Referring to the accompanying drawings,— Figure 1 is an end elevation of a driving and driven pulley and an intermediate expansible pulley belted thereto; Fig. 2 is a side elevation of the rockshaft and arms which carry the expansible pulley and of a straight counterbalancing spring; Fig. 2ª is a detail end view of the spring-engaging collar shown in Fig. 2; Fig. 3 is a side elevation of a rockshaft controlled by two coiled springs; Fig. 4 is a side elevation of a rockshaft having depending arms to carry the pulley and cams which receive the pressure of a straight spring; and Fig. 4ª is a detail end view of one of the cams shown in Fig. 4.

Referring to Fig. 1, the driving pulley 1 and driven pulley 2 are connected to the two drums of the intermediate pulley 3 by the belts 4, 5, respectively. The double pulley is carried by a shaft journaled in bearings at the upper ends of rock-arms 6, which are fixed on a rockshaft 7 journaled in bearings 8. The expansible pulley 3 may be of any well-known construction, comprising plural sets of rim-sections which are shifted to and from the axis by suitable adjusting means. As the rim-sections of one drum are adjusted outward and those of the other drum inward, the working lengths of the belts 4, 5 correspondingly change and the expansible pulley rocks on the shaft 7, thereby shifting its center of gravity to one side of the line of support. In the position shown in Fig. 1, the horizontal component of the weight of the expansible pulley and its support-arms tends to increase the tension of the belt 5 and decrease that of the belt 4.

Referring to Fig. 2, a spring 9 consisting of a steel rod extends between and is entered at its ends in the bearings 8, beneath and parallel to the rockshaft. Adjustably secured on the rockshaft intermediate its bearings is a collar 10 having downwardly-projecting lugs 11 which engage the spring-rod. As the expansible pulley tilts in either direction to one side of the axis of its rockshaft, the spring 9 tends to restore it to a central position, the force of the spring being predetermined to compensate for the unbalanced weight of the pulley.

In Fig. 3, short spiral springs 12 are shown surrounding the rockshaft 7, one end of each spring being secured to the shaft and the other end to a bearing 8. These coiled springs normally hold the rock-arms in a vertical position.

Fig. 4 illustrates a spring-mechanism for counterbalancing the weight of a pulley which is hung in depending rock-arms 6ª. A straight spring-rod 13, like that shown in Fig. 2, extends between and is held at its ends by the bearings 8. Adjustably secured upon the rockshaft near its middle are two rings 14 having cams 15 which bear against antifriction rollers 16 loosely carried by the rod 13. The shape of the cams and the force of the spring 13 are predetermined in accordance with the weight of the pulley to be counterbalanced. The pressure of the spring on the cams may also be varied by adjusting the cams to or from each other on the rockshaft.

I claim:—

In a speed-changing mechanism, an expansible pulley having plural drums, a rock-shaft having arms carrying said pulley, journal-bearings at the ends of said shaft, and a spring engaging said shaft between said bearings and arranged to counterbalance the weight of said pulley as it rocks in either direction, as set forth.

In testimony whereof, I affix my signature in presence of two witnesses.

CHARLES J. REED.

Witnesses:
H. W. ROGERS,
J. W. RITTER.